United States Patent
Schlotman, Jr. et al.

(10) Patent No.: US 11,108,831 B2
(45) Date of Patent: Aug. 31, 2021

(54) MACHINE POLICY CONFIGURATION FOR MANAGED DEVICES

(71) Applicant: VMware, Inc., Palo Alto, CA (US)

(72) Inventors: Robert Stanley Schlotman, Jr., Cumming, GA (US); Zuhaib Zakaria Abdul Zakaria Khan, Cumming, GA (US); Srinivasan Subramanian, Johns Creek, GA (US); Arnout Martijn Grootveld, Amsterdam (NL)

(73) Assignee: VMWARE, INC., Palo Alto, CA (US)

( * ) Notice: Subject to any disclaimer, the term of this patent is extended or adjusted under 35 U.S.C. 154(b) by 323 days.

(21) Appl. No.: 16/240,223

(22) Filed: Jan. 4, 2019

(65) Prior Publication Data
US 2020/0220902 A1 Jul. 9, 2020

(51) Int. Cl.
H04L 29/06 (2006.01)
H04L 12/24 (2006.01)
H04W 4/50 (2018.01)

(52) U.S. Cl.
CPC ........ *H04L 63/205* (2013.01); *H04L 41/0813* (2013.01); *H04L 41/0893* (2013.01); *H04L 41/50* (2013.01); *H04W 4/50* (2018.02)

(58) Field of Classification Search
CPC ....... H04L 63/205; H04L 41/28; H04L 63/10; H04W 4/50; G06F 21/10
USPC .......................................................... 726/1
See application file for complete search history.

(56) References Cited

U.S. PATENT DOCUMENTS

| | | | | |
|---|---|---|---|---|
| 4,884,228 A * | 11/1989 | Stanley | ................ | G01R 13/22 702/123 |
| 8,185,548 B2 * | 5/2012 | Lim | ................ | H04L 63/20 707/781 |
| 8,627,490 B2 * | 1/2014 | Lim | ................ | G06F 21/6227 726/27 |
| 9,497,224 B2 * | 11/2016 | Sweet | ................ | H04L 9/0643 |
| 10,326,841 B2 * | 6/2019 | Bradley | ................ | H04L 63/102 |
| 2002/0194497 A1 * | 12/2002 | McGuire | ................ | H04L 63/20 726/11 |
| 2004/0199647 A1 * | 10/2004 | Ramarao | ................ | H04L 63/104 709/229 |
| 2009/0282228 A1 * | 11/2009 | Childs | ................ | G06F 9/44505 713/1 |
| 2011/0021173 A1 * | 1/2011 | Randhawa | ................ | H04W 4/90 455/404.1 |
| 2012/0281251 A1 * | 11/2012 | Salgado | ................ | G06F 3/1204 358/1.15 |
| 2014/0120961 A1 * | 5/2014 | Buck | ................ | H04W 4/12 455/466 |

(Continued)

OTHER PUBLICATIONS

Wikipedia, "Command queue", 2021 (Year: 2021).*

*Primary Examiner* — Ondrej C Vostal
(74) *Attorney, Agent, or Firm* — Thomas | Horstemeyer, LLP

(57) ABSTRACT

Disclosed are various examples for managing and customizing policy configurations on user devices enrolled in an enterprise management service. The policy configurations can include machine policies and/or user policies. An administrator can customize a baseline including a list of policies supported by an operating system of managed user devices. A management component on the user devices can obtain the baseline specified by the administrator from a managing service and apply the policies to the user device.

20 Claims, 5 Drawing Sheets

(56) References Cited

U.S. PATENT DOCUMENTS

| | | | |
|---|---|---|---|
| 2015/0089673 A1* | 3/2015 | Beckman | G06F 21/10 |
| | | | 726/29 |
| 2016/0044081 A1* | 2/2016 | Pingenot | H04L 63/08 |
| | | | 709/219 |
| 2016/0306549 A1* | 10/2016 | Nadakuditi | G06F 13/4282 |
| 2017/0115979 A1* | 4/2017 | Murthy | H04L 67/16 |
| 2017/0171245 A1* | 6/2017 | Lee | G06F 16/958 |
| 2018/0109430 A1* | 4/2018 | Quintas | H04L 41/28 |
| 2018/0167399 A1* | 6/2018 | Vas | H04L 63/101 |
| 2018/0213347 A1* | 7/2018 | Kumar | H04W 12/08 |
| 2018/0336351 A1* | 11/2018 | Jeffries | H04L 63/101 |
| 2019/0199803 A1* | 6/2019 | Murray | H04L 41/046 |
| 2019/0215343 A1* | 7/2019 | Rykowski | H04W 12/0027 |
| 2019/0230063 A1* | 7/2019 | McCready | H04W 12/03 |
| 2019/0342338 A1* | 11/2019 | Anandam | H04L 63/101 |
| 2020/0205016 A1* | 6/2020 | Scott | H04W 24/02 |

* cited by examiner

New Baseline                                                          ✕

1. General
2. Choose Template
3. Customize
4. Add Policy
5. Summary

Review the summary before saving this baseline

General

| Baseline Name: | XYZ Corp. Baseline |
| Description: | Baseline for Global Security |
| Version: | 1 |
| Managed By: | Global Admin |

Template

| Template Name: | CIS Microsoft Windows 10 Enterprise Benchmarks |
| Version: | 1703(L1) |

Edited

| ∨ | Computer Configuration/Software Settings/Local Policies/Security Options | Edited |
| | Rename administrator account | XYZ_admin |

Deleted

| > | Computer Configuration/Software Settings/Local Policies/Policy1 | Enabled |
| > | Computer Configuration/Software Settings/Local Policies/Policy2 | Enabled |
| | Computer Configuration/Software Settings/Local Policies/Policy3 | Not Configured |

Cancel   Previous   Save   Save and Publish

MANAGEMENT CONSOLE

Dashboard
Listview
Life Cycle
Profiles and Resources
  Baselines
  Profiles
  Resources
  Batch Status
  Profile Settings
Compliance Policies
Device Settings
Peripherals
Certificates

Baselines

New   EDIT   ASSIGN   DELETE

| ☑ | Name | Version | Template | Managed By | Install S |
|---|------|---------|----------|------------|-----------|
| ☑ | XYZ Corp. Baseline | 1 | CIS 160 | Global Admin | View |

149 Installed
70 Not Installed
219 Assigned

MACHINE POLICY CONFIGURATION FOR MANAGED DEVICES

BACKGROUND

With the emergence of bring-your-own-device (BYOD) technology in the workplace, enterprises permit employees or other personnel to use their own devices for business purposes. This can include accessing enterprise data, such as email and corporate documents. However, prior to an employee using his or her own device in the workplace, a company can require the employee to enroll with a management service capable of protecting enterprise data from theft, loss, and unauthorized access. Administrators can utilize the management service to oversee operation of the devices enrolled with or otherwise managed by the service.

As devices enrolled with the management service have operating systems and applications installed thereon, capabilities of the operating systems and applications are constantly being changed when patches, security fixes, upgrades, and other updates are made available and installed on the devices. In some instances, multiple updates can be released during the life-cycle of a device. These updates can be downloaded and installed from a vendor's servers to a user device in order to update the applications or operating system of the computing device. However, using the automatic update option from a vendor suffers the drawback that an information technology (IT) department in a corporate setting cannot test the updates or control the install for employee devices.

To address this, some organizations can configure when and how updates are to be downloaded and installed onto a computing device. For example, an organization can use a Group Policy Object (GPO) to ensure that all devices connected or joined to a directory service or domain (e.g., a Microsoft Active Directory domain) operated by the organization download and install updates from a central repository (e.g., Microsoft Windows Server Update Services®). This process, therefore, requires that the device to be updated is joined with a domain, typically the employee's company, and obtains updates through the company domain instead of the vendor's servers. However, computing devices belonging to the organization that are not connected to, joined to, or otherwise enrolled or associated with the directory service or domain would be unable to download and install updates from the central repository. Further, an IT department would be unable to control update installations for non-domain devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 3A-3D are drawings of example user interfaces of the administrator console of the networked environment.

DETAILED DESCRIPTION

Figure 1:
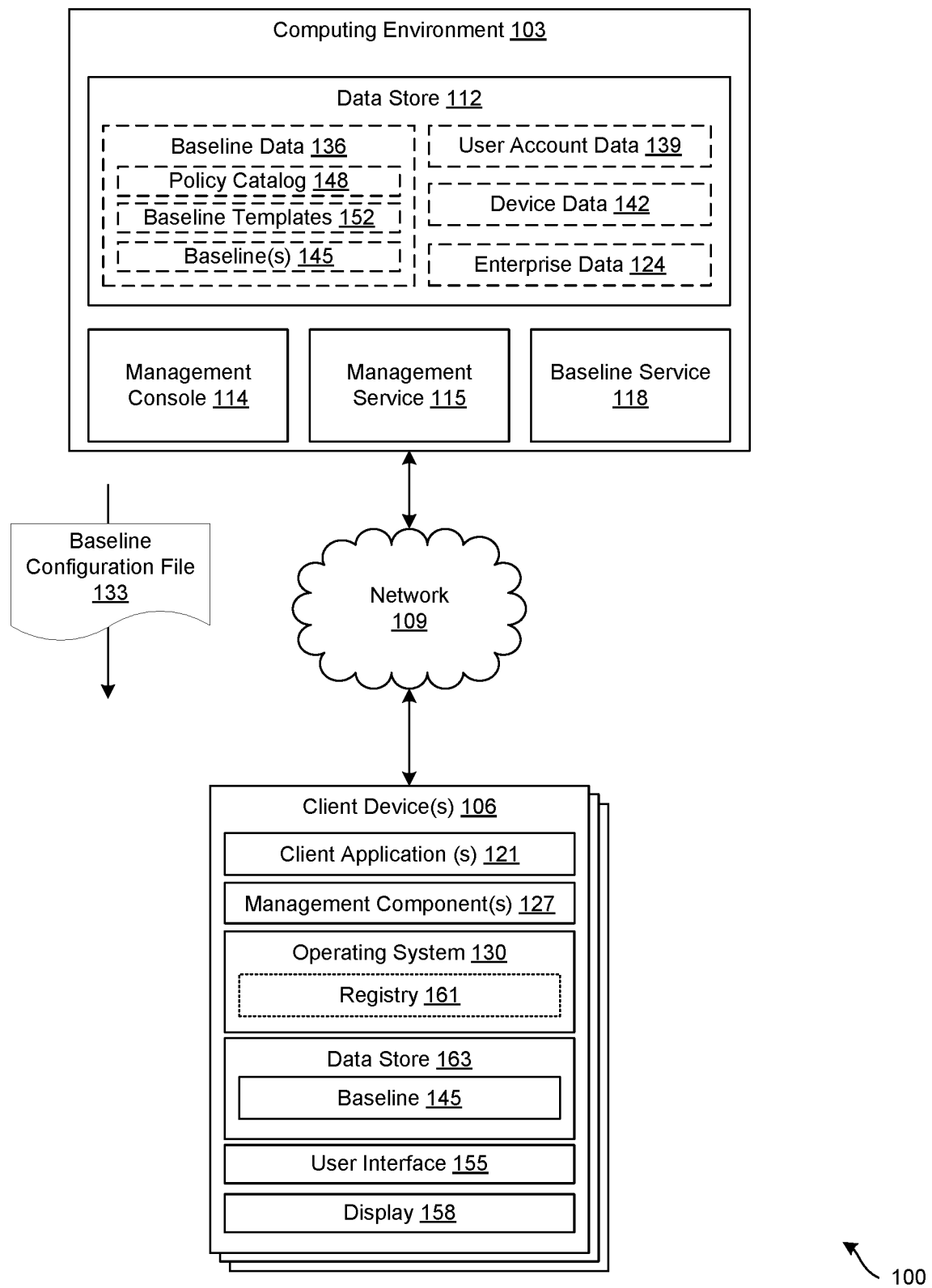
FIG. 1 is a drawing of an example of a networked environment, including a management system and a client device.

The present disclosure relates to managing and customizing policy configurations on user devices enrolled in an enterprise management service. The policy configurations can define the behavior of the system for a group of user devices enrolled in the management service. The policies can include registry-based policies as well as policies that are set outside of the registry, such as, for example, security policies, installation options, script options, and/or other types of policies. For example, the policies can correspond to Group Policy settings for Microsoft Windows® devices and/or other types of policies.

As devices enrolled with the management service have operating systems and applications installed thereon, capabilities of the operating systems and applications are constantly being changed when patches, security fixes, upgrades, and other updates are made available and installed on the devices. As a result to the constant changes, configurations of the enrolled devices can be inconsistent with the capabilities of software platforms of the enrolled devices potentially subjecting the enrolled devices, as well as enterprise data accessible thereon, to numerous security vulnerabilities, such as theft, loss, and unauthorized access.

In typical enterprise management environments, once a policy update or new release occurs, administrators can login to a corresponding domain using an administrator console and input the updated policy for a given domain. In this situation, all devices that are listening and/or otherwise connected to that particular domain can then access the updated policy. However, with this process, policies are applied and/or updated only when the devices are connected to the domain of the enterprise network. In addition, policies typically are managed through multiple tools (e.g., GPO through Active Directory (AD), Local Group Policy, Mobile Device Management (MDM)) which work independently and can cause policy updates to be inconsistent and potentially conflicting. Accordingly, it can be beneficial to generate customized policy baselines that define a consolidated list of machine and/or user policies and settings and are accessible to managed devices regardless of whether the devices are connected to the enterprise network. Further, it can be beneficial for the managed devices to apply the policies to the devices according to the baseline configurations.

According to various implementations, an administrator can use an administrator console to create a policy baseline for a group of user devices that defines a list of recommended policies to be applied to the user devices within the particular group. In some examples, the customized policy baseline can be a modification of an industry-defined template (e.g., Microsoft® security baseline, Center of Internet Security (CIS) Benchmark, Health Insurance Portability and Accountability Act (HIPAA) Baseline) that defines a list of recommended policies to be applied. In other examples, the customized policy baseline can be a modification of a preconfigured baseline. A management component executable on the managed device can communicate with the management service to obtain the policy baseline. The management component can then apply the policies to the managed device in accordance to the customized baseline. For example, the management component can modify a registry of the operating system of the client device in accordance to the policies. The policies can correspond to both machine policies and user policies.

With reference to FIG. 1, shown is an example of a networked environment 100. The networked environment 100 can include a computing environment 103 and client devices 106 in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environment 103 can include a grid computing resource and/or any other distributed computing arrangement. The computing devices can be located in a single installation or can be distributed among many different geographical locations. The computing environment 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client devices 106 remotely over the network 109, the computing environment 103 can be described as a "remote" or "cloud" computing environment 103.

The computing environment 103 can include a data store 112. The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a management console 114, a management service 115, a baseline service 118, as well as other applications, services, processes, systems, engines, or functionality not discussed in detail herein. The management service 115 can oversee the operation of multiple client devices 106. In some embodiments, an enterprise, such as one or more companies or other organizations, can operate the management service 115 to oversee or manage the operation of the client devices 106 of its employees, contractors, customers, or other users having user accounts with the enterprise.

The management console 114 can provide an administrative interface for configuring the operation of the management service 115 and the configuration of client devices 106 that are administered by the management service 115. Accordingly, the management console 114 can correspond to a web page or web application provided by a web server hosted in the computing environment 103. For example, the management console 114 can provide an interface for an administrative user to create baselines to be applied to individual client devices 106, as well as various other actions related to the operation of various implementations.

The management service 115 can cause various software components to be installed on a client device 106. Such software components can include, for example, client applications 121, resources, libraries, drivers, device configurations and profiles, or other similar components that require installation on the client device 106 as specified by an administrator of the management service 115. The management service 115 can further cause policies to be implemented on a client device 106. Policies can include, for example, restrictions or permissions pertaining to capabilities of a client device 106 such that access to enterprise data 124 is secured on the client device 106.

The management service 115 can interact with one or more client applications 121 executed on the client device 106 to perform management functions. In one example, the management service 115 can interact with a management component 127 on a client device 106 associated with an end user to enroll the client device 106 with the management service 115. The management components 127 can be installed when the client device 106 is enrolled as a managed device with the management service 115. When enrolled, the management component 127 can be registered as a device administrator of the client device 106, which can provide the management component 127 with sufficient privileges to control the operation of the client device 106. In one example, the management component 127 can be registered as the device administrator through the installation of a management profile at the operating system 130 of the client device 106 that causes the operating system 130 to designate the management component 127 as the device administrator.

The management service 115 can direct the management component 127 to perform device management functions on the client device 106. For example, the management service 115 can direct the management component 127 to control access to certain software or hardware functions available on the client device 106. As a result, the management service 115 can verify that the configuration and operation of the client device 106 is in conformance with predefined criteria that ensures that enterprise data 124, or other data, is protected from data loss, unauthorized access, or other harmful events.

The management service 115 can further provision enterprise data 124 to the client device 106 through the management component 127. In one example, the management service 115 can cause the management component 127 to control use of the client device 106 or provision enterprise data 124 to the client device 106 through use of a command queue provided by the management service 115. In some examples, the management service 115 can store commands in a command queue associated with a particular client device 106 and accessible by the particular client device 106. In some examples, the management service 115 can transmit an instruction to an original equipment manufacturer (OEM) messaging service specific to the client devices 106 to cause the OEM specific messaging service to send an instruction to the operating systems 130 of the client devices 106, which causes the client devices 106 to retrieve commands from the command queues provided by the management service 115. In other examples, the management component 127 is executed by such client device 106 to retrieve the contents of the command queue. In one example, the management component 127 can retrieve the contents of the command queue on a configured interval, such as every four hours, or upon detection of a certain event, such as detection of an unauthorized application being executed by the client device 106. The management service 115 can also push commands to the management component 127.

In any case, the management component 127 can receive the contents of the command queue from the management service 115. In one example, the contents of the command queue can include a baseline configuration file 133 generated by the baseline service 118. The management component 127 can parse the baseline configuration file 133 to identify policies and settings to be applied on the client device 106. The baseline configuration file 133 can further include administrator defined instructions with respect to a deployment schedule of the baseline 145, a reapplication schedule, and/or other features associated with the baseline 145 as specified by the administrator. In some implementations, the management component 127 can modify a registry 161 associated with an operating system 130 of the client device 106 in accordance to the baseline configuration file 133.

In another application, the command queue can include a command that the management component 127 should cause to be executed on the client device 106. In another example, the contents of the command queue can include a resource or other client application 121 that the management component 127 should cause to be installed on the client device 106, which the client device 106 can access through a specified uniform resource locator (URL).

The baseline service 118 can manage machine and/or user policies (e.g., Group Policy settings) and baselines 145 for enrolled devices 106. For example, the baseline service 118 can generate and manage a policy catalog 148 including policies supported by different versions of one or more operating systems. The baseline service 118 can also provide an interface for administrators by dynamically generating a series of user interfaces, also known as a "wizard," to facilitate the creation and customization of a policy baseline 145 for a selected group of managed devices 106 through administrator input. For example, the baseline service 118 can provide one or more user interfaces that allow an administrator to review the catalog of policies and customize baselines 145 for different device groups.

The baseline service 118 can further facilitate the addition, modification, and/or deletion of policies from a predefined baseline template. Based on the administrator customization, the baseline service 118 can generate a baseline 145 for a particular group of devices 106. The baseline 145 can then be accessible to the client devices 106 through the management service 115. In various implementations, the baseline service 118 can be integrated with the management service 115. In other implementations, the baseline service 118 is independent of the management service 115.

The data stored in the data store 112 can include, for example, baseline data 136, user account data 139, device data 142, enterprise data 124, as well as other data. The baseline data 136 includes data associated with the baselines 145 generated by the baseline service 118. The baseline data 136 includes a policy catalog 148, baseline templates 152, baselines 145, and/or other data. The policy catalog 148 includes a catalog of policies (e.g., Group Policies for Microsoft Windows®) supported by different operating systems and/or versions of operating systems. The policy catalog 146 can be structured according to operating system, version release, and/or other features. For example, the policy catalog 148 can include a first set of policies supported by Windows® 10, version 1703 and a second set of policies supported by Windows® 10, version 1709.

The baseline templates 152 include templates for configuring baselines 145. For example, the baseline templates 152 can include industry specific templates (e.g., Microsoft® security baseline, CIS Benchmark, HIPAA Baseline) that include a recommended list of policy configurations. The baseline templates 152 can provide a starting point for an administrator configuring a baseline 145 for a given device group through the management console 114. The user account data 139 can include information pertaining to end users of the client devices 106 enrolled with the management service 115. For instance, the user account data 139 can include data used to authenticate an end user, such as a username, password, email address, biometric data, device identifier, registry identifier, or other data. Additionally, the user account data 139 can include other information associated with an end user, such as name, organization unit, or other information.

The device data 142 can include information about the client device 106. The device data 142 can include, for example, information specifying applications that are installed on the client device 106, configurations or settings that are applied to the client device 106, user accounts associated with the device 106, the physical location of the client device 106, the enterprise associated with the client device 106, the network to which the client device 106 is connected, the device group(s) to which the client device 106 belongs, and/or other information associated with the client device 106. Enterprise data 124 can include email, corporate documents, social media, messages, enterprise applications, confidential documents, and other enterprise content or communications.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system 130 configured to execute various client applications 121. Some client applications 121 can access network content served up by the computing environment 103 or other servers, thereby rendering a user interface 155 on a display 158, such as a liquid crystal display (LCD), touch-screen display, or other type of display device. To this end, some client applications 121 can include a browser or a dedicated application, and a user interface can include a network page, an application screen, or other interface. Further, other client applications 121 can include device management applications, enterprise applications, social networking applications, word processors, spreadsheet applications, media viewing application, or other applications.

The operating system 130 of the client device 106 can include Microsoft Windows® operating system, or other operating systems. The operating system 130 can maintain a system registry 161, which is a database or data store that contains one or more device specific, application specific, or user specific preferences, settings or other variables. In some scenarios, the system registry 161 can be stored in the client data store 163 or in any other memory or mass storage device associated with the client device 106. In various implementations, the management component 127 can modify one or more settings in the system registry 161 in accordance to a baseline 145 obtained from the management service 115.

The client device 106 can also include a data store 163. The data store 163 can include memory of the client devices 106 or any other storage resources on which data can be stored by the client device 106. In some examples, the data store 163 can include baseline(s) 145. The baseline 145 includes a preconfigured list of policies (e.g., Group Policy settings) and settings that are configured by an administrator through a management console 114. The data store 163 can include other data associated with the client application 121, the operating system 130, and the management component(s) 127.

Next, a general description of the operation of the various components of the networked environment 100 is provided. To begin, an administrator can interact with a management console 114 using a browser on a client device 106 to review the policy catalog 148 and/or customize baselines 145 for device groups within an enterprise network. For example, the administrator can search through the policy catalog 148 to review the machine and/or user policies supported by different versions of an operating system(s) 130. In some implementations, the administrator can begin to create a baseline 145 for a given device group by selecting a baseline template 152 using a user interface 155 of the management console 114. The baseline template 152 includes a predefined list of recommended policies and settings to apply to a device 106. The baseline template 152 can include an industry specific template defining a policy baseline (e.g., Microsoft security baseline, CIS benchmark, HIPAA), a previously defined baseline 145, and/or other type of template. Once a baseline template 152 is selected, an administrator can customize a baseline 145 for a particular group of devices 106. For example, through interactions with the management console 114, the administrator can add, modify, and/or delete policies and/or settings from the baseline template 152.

Using the configuration defined by an administrator, the baseline service 118 can generate a baseline configuration file 133 that includes the baseline 145 for a given device. The baseline configuration file 133 can further specify a schedule and/or maintenance window for the baseline 145 to be applied by the management component 127. In some examples, the baseline configuration file 133 can specify instructions for reapplying a baseline 145 in an instance in which policies are overwritten by a user and/or administrator of the client device 106.

In various implementations, the management component 127 on a client device 106 can communicate with a management service 115 to obtain the baseline configuration file 133 that includes the baseline 145. In some implementations, the management component 127 can parse the baseline configuration file 133 to identify the list of customized policies and/or settings for the particular device 106. In some examples, the baseline configuration file 133 can include an extensible markup language (XML) document, or other suitable type of file, that can be communicated to the client device 106 or otherwise accessed by the management component 127.

Accordingly, the management component 127 can apply the policies and/or settings defined by the obtained baseline configuration file 133 such that the client device 106 is configured as specified by the administrator. For example, the management component 127 can modify values in the registry 161 of the operating system 130 in accordance to the defined policies. In another example, the management component 127 can modify non-registry based policies in accordance of the baseline 145. According to various implementations, the management component 127 can apply user policies and/or machine policies.

In some implementations, the obtained baseline configuration file 133 can include a generic baseline 145 that is not specific for a particular device 106 or type of device 106. For example, the generic baseline 145 can include settings for policies that cannot be applied by a particular client device 106. In this example, the generic baseline 145 can be associated with a particular operating system (e.g., Windows) and some of the settings may not be supported by some versions of the operating system 130. A management service 115 can send the baseline 145 to all enrolled devices 106 associated with the particular operating system 130. In some implementations, the management component 127 can parse the baseline configuration file 133 to identify the settings that can be applied to the particular client device 106 and disregard the settings that cannot be applied to the particular device 106. The management component 127 can then apply the identified user policies and/or machine policies relevant to the particular client device 106.

In some implementations, a state of a client device 106 can be a factor with respect to baseline configuration and/or baseline distribution. For example, a management service 115 can determine which baseline 145 to distribute to a particular device 106 based at least in part on the device state. In other examples, a management component 127 can determine which policies within a baseline 145 to apply based at least in part on the device state.

The device state for an enrolled device 106 includes a plurality of characteristics describing the enrolled device 106, such as hardware features enabled on the enrolled device 106, software features enabled on the enrolled device 106, settings applied to the enrolled device 106, resources (e.g., files) accessible to and/or stored by the enrolled device 106, geographic locations of operation of the enrolled device 106, and/or time of operation of the enrolled device 106. Additionally, the device state for an enrolled device 106 may include a finite state that describes a particular enrolled device 106 at a moment in time, or a comprehensive state that describes a particular enrolled device 106 over a particular period of time.

Figure 2:
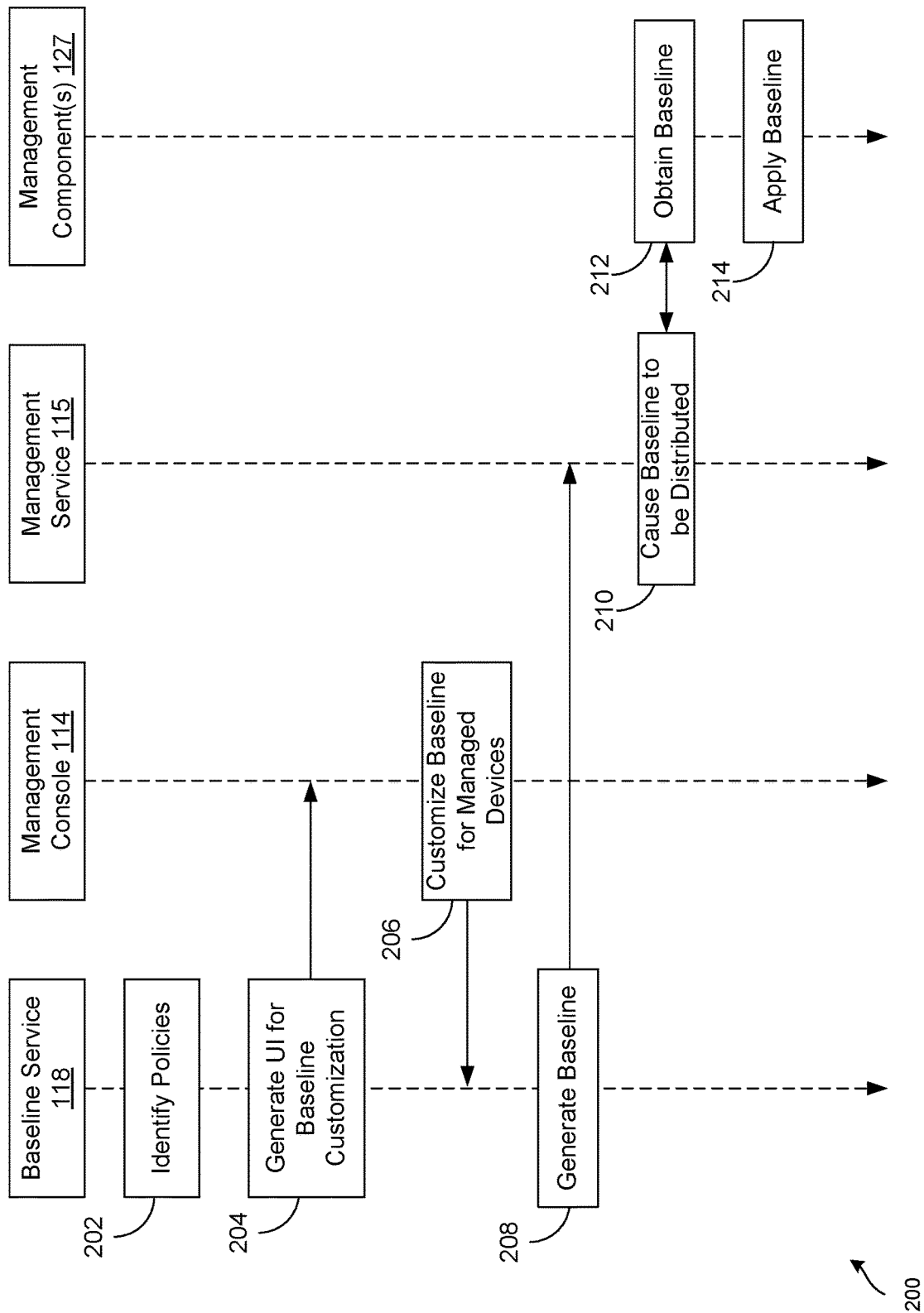
FIG. 2 is an example of a sequence diagram illustrating functionality implemented by components of the networked environment.

Turning now to FIG. 2, a sequence diagram 200 is shown illustrating functionality implemented by components of the networked environment 100. As policies supported by an operating system 130 are updated and released over time, it can be beneficial to centralize policy management for groups of devices 106 in an enterprise network such that a given device 106 can access a baseline 145 for the device group associated with a given device 106 and apply the policies defined in the baseline 145 accordingly.

Starting with step 202, the baseline service 118 identifies the policies supported by one or more versions of an operating system 130. The policies can include machine policies and/or user policies that define the behavior of a device 106. In various examples, the policies can include Group Policies supported by Microsoft Office °. The baseline service 118 can maintain a policy catalog 148 that includes the policies supported by the operating system 130. The policy catalog 148 can be updated as updates and/or new releases of policies are introduced by an OEM and/or other entity. For example, an OEM can provide information with a release of new or updated policies. In some examples, the information can be automatically pushed to the management system. In other examples, the OEM publishes information that can be accessed by the management system.

In step 204, the baseline service 118 can generate a series of user interfaces 155 to be displayed on a client device 106 associated with an administrator through interactions with the management console 114. One or more of the user interfaces 155 can allow an administrator to search a policy catalog 148 and review the policies supported by an operating system 130. The user interfaces 155 can further provide an administrator of an enterprise with the ability to customize a baseline 145 for a group of managed devices 106.

In step 206, the management console 114 can present the series of user interfaces 155 to allow an administrator to create a customized baseline 145 for a group of managed devices 106. For example, a user interface 155 can include interface components that allow an administrator to review and select a baseline template 152 that provides a recommended list of policies and settings to be applied by devices 106. Upon selection of a baseline template 152, the administrator can add, modify, and/or delete policies and/or settings through interactions with one or more user interfaces 155. The user interfaces 155 can further allow an administrator to save the customized baseline 145 and request that the baseline 145 be published to the devices 106 within a given device group for the customized baseline 145.

In step 208, the baseline service 118 receives the request to generate and publish the baseline 145 as defined by the administrator using the management console 114. Accordingly, the baseline service 118 generates a baseline configuration file 133 that includes the list of recommended policies defined by the administrator to be applied to the devices 106 for a device group. The baseline configuration file 133 can be generated in a format that is understood by the management component 127 such that the management component 127 can identify and apply the policies as specified by the administrator. In some implementations, the baseline configuration file 133 can include an extensible markup language (XML) document, or other suitable type of file, that can be communicated to the client device 106 or otherwise accessed and understood by the management component 127.

In step 210, the management service 115 causes the baseline configuration file 133 to be distributed to the client devices 106. For example, the management service 115 can store the baseline configuration file 133 in a command queue associated with a particular device and accessible by the particular client device 106 through the management component 127. In another example, the management service 115 can push the baseline configuration file 133 to the management component 127.

In step 212, the management component 127 of the client device 106 obtains the baseline configuration file 133 from the management service 115 and parses the baseline configuration file 133 to identify the list of policies to be applied to the client device 106 as specified by the administrator.

In step 214, the management component 127 configures the client device 106 in accordance to the baseline 145 included in the baseline configuration file 133. For example, the management component 127 can modify the registry 161 of the operating system 130 in accordance to a policy and/or setting as specified by the administrator. The management component 127 can modify the registry 161 with respect to both user policies and machine policies. In some implementations, the baseline 145 identifies policies and/or settings that are applied outside of the registry 161, such as, for example, security policies that are applied through a command line interface of the operating system and are not statically entered into a registry 161.

Figure 3A:
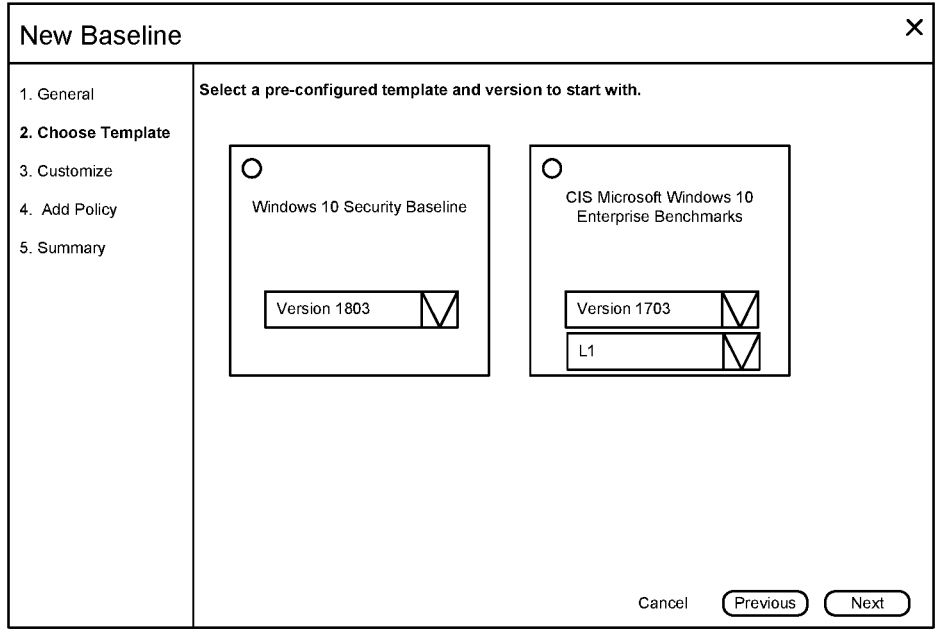

Moving on to FIGS. 3A-3D, shown are example user interfaces 155 (e.g., 155a, 155b, 155c, and 155d) that allow an administrator to search policies supported by an operating system 130, customize baselines 145 to be applied to client devices 106 enrolled in a management service, and review an installation status of the baselines 145 distributed to the client devices 106. To begin, FIG. 3A illustrates an example user interface 155a that includes interface components for selecting a baseline template 152 that includes a starting list of recommended policies that can be applied to a client device 106. For example, the user interface 155a includes selectable components for a Microsoft Windows® 10 Security Baseline and a CIS Baseline. However, it should be noted that the baseline templates 152 are not limited to these presented industry specific baseline templates 152 and can include other types of templates, including, previously saved baselines 145, or other features.

The user interface 155a further includes selectable components that allow an administrator to specify a particular version associated with the baseline template 152. In various examples, the interface components can include text boxes, Boolean fields, dropdown menus, radio buttons, check boxes, buttons, or other user interface components. Once an administrator selects a particular baseline template 152, the administrator is allowed to modify the baseline 145 through interactions with additional user interfaces 155 provided by the management console 114.

Figure 3B:
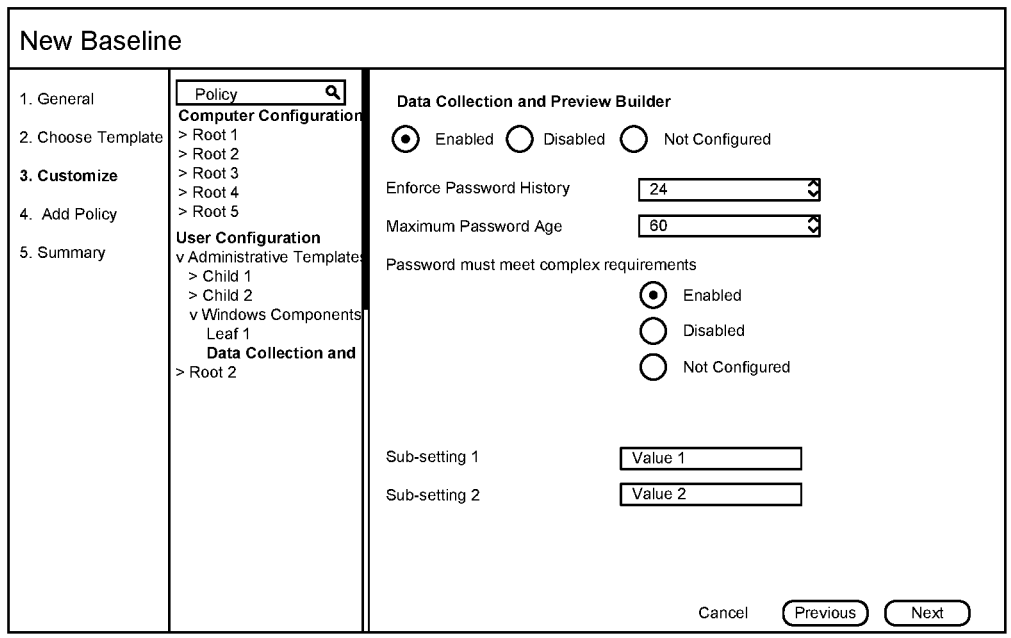

FIG. 3B illustrates an example user interface 155b that allows an administrator to review the different policies defined in the baseline template 152 and modify accordingly. For example, the user interface 155b illustrates the settings associated with the data collection and preview builder policy. In various examples, an administrator can modify the policy as desired. The user interface 155b includes interface components that allow an administrator to modify the policies and/or settings as desired.

Although not illustrated in FIG. 3B, the administrator, interacting with the management console 114, can search for additional policies that are not included in the baseline template 152 and add policies to the baseline 145. Similarly, the administrator, interacting with the management console 114, can delete policies that are included in a list of policies for a given baseline template 152. The administrator can proceed through the series of user interfaces 155 provided by the wizard to customize the baseline 145 as desired.

In FIG. 3C, shown is an example user interface 155c that includes a summary of a customized baseline 154 that can be presented to the administrator interacting with the management console 114. For example, the user interface 155 of FIG. 5C provides a summary of the customized baseline 154 that details the baseline template 152 used to generate the baseline 145, any modifications made to a particular policy, deleted policies, and/or additional information. The user interface 155c further includes selectable components that allow an administrator to save and/or publish the baseline 145. For example, in response to receiving a selection of the "Save and Publish" component, the baseline service 118 can generate a baseline 145 as specified by the administrator and the management service 115 can cause the baseline 145 to be distributed to the client devices 106.

FIG. 3D illustrates an example user interface 155d that can provide an administrator with a review of the client devices 106 that have applied the created baseline 145. In particular, an administrator, through the management console 114, can review the status of the different created baselines 145. As shown in FIG. 3D, the administrator can be notified of the number of devices 106 included in the group the baseline 145 is assigned to, the number of devices 106 that have installed the baseline 145, and the number of devices 106 that have not installed the baseline 145. In addition, the administrator is allowed to edit, assign, and/or delete previously created baselines 145 as needed.

Figure 4:
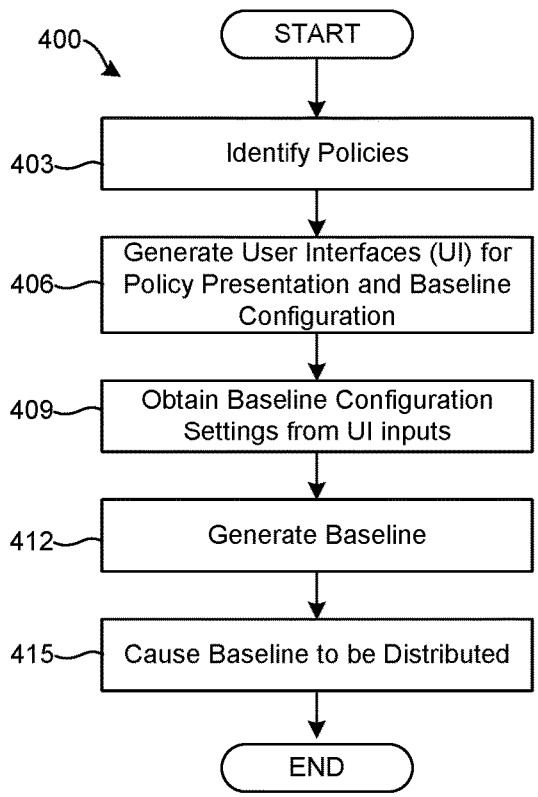
FIGS. 4 and 5 are example flowcharts illustrating functionality implemented by components of the networked environment.

Moving on to FIG. 4, shown is a flowchart 400 that provides one example of the operation of a portion of the computing environment 103. The flowchart of FIG. 4 can be viewed as depicting an example of elements of a method implemented by the management service 115, baseline service 118, or other suitable software component according to one or more examples. The separation or segmentation of functionality as discussed herein is presented for illustrative purposes only.

In step 403, the baseline service 118 identifies the policies supported by one or more versions of an operating system 130. The policies can include machine policies and/or user policies that define the behavior of a device 106. According to various implementations, the policies can be included in a policy catalog 148 and organized in a hierarchical configuration according to operating system 130, operating system version, policy type, and/or other features.

In step 406, the baseline service 118 generates one or more user interfaces 155 for an management console 114 that allows an administrator to review and search policies supported by an operating system 130. The user interfaces 155 can further allow an administrator to customize a baseline 145 for managed devices 106. The user interfaces 155 can further allow an administrator to select a baseline template 152 for a list of recommended policies and then customize the baselines 145 by adding, modifying, and/or deleting policies included in the baseline template 152.

In step 409, the baseline service 118 can obtain baseline configuration settings from inputs provided by an administrator through the management console 114. The interface inputs can comprise a policy search request, a baseline creation request, a baseline template selection, modifications to an existing policy included in a baseline template 152, an addition of a policy, a deletion of a policy, a request to distribute the baseline 145 to client devices 106, and/or other inputs.

In step 412, the baseline service 118 generates the baseline 145 as specified by an administrator through the management console 114. For example, the baseline service 118 can generate a baseline configuration file 133 that defines the baseline 145. The baseline configuration file 133 can be generated in a format that can be understood by a management component 127 of a client device 106. In some examples, the baseline configuration file 133 can comprise an XML document that the management component 127 can parse to extract the list of policies and/or settings to be applied to the client device 106 as specified by the administrator.

In box 415, the management service 115 can cause the baseline 145 to be distributed to the client devices 106. In some examples, the management service 115 can push the baseline configuration file 133 to the client devices 106 in the device group associated with the baseline 145. In other examples, the management service 115 can place the baseline configuration file 133 in command queues associated with and accessible to the client devices 106 associated with the baseline 145. Thereafter, the process can proceed to completion.

Figure 5:
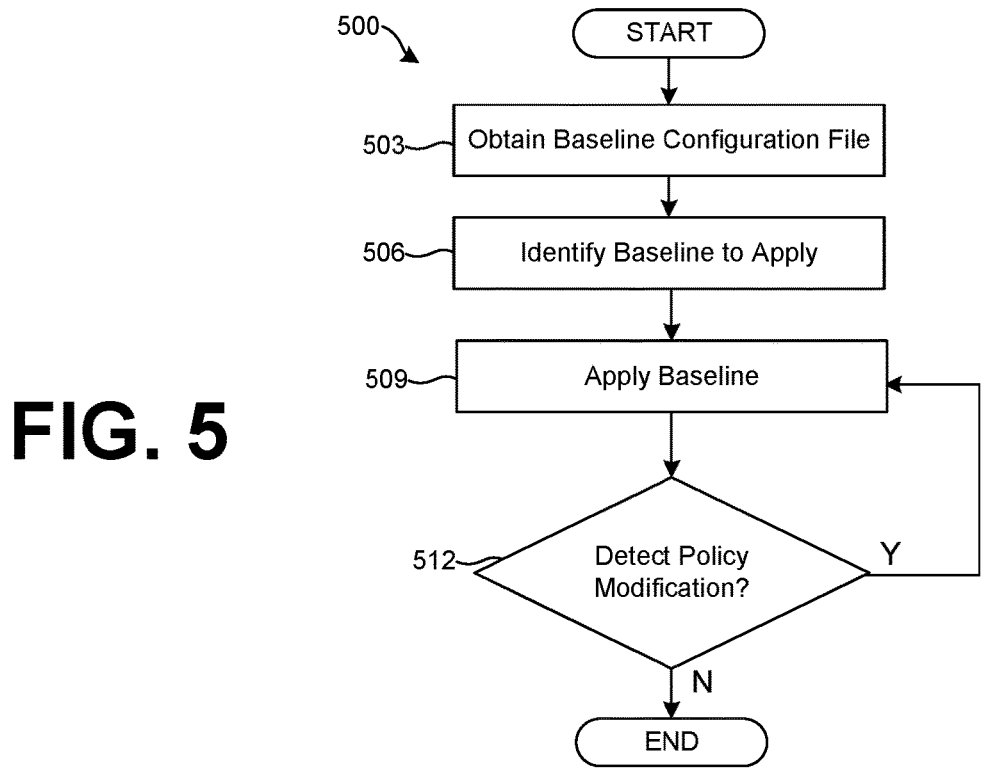

Moving on to FIG. 5, shown is a flowchart 500 that provides one example of the operation of a portion of the client device 106. The flowchart of FIG. 5 can be viewed as depicting an example of elements of a method implemented by the management component 127 or other suitable software component according to one or more examples. The separation or segmentation of functionality as discussed herein is presented for illustrative purposes only.

In step 503, the management component 127 obtains a baseline configuration file 133 from the computing environment 103. In some examples, the baseline configuration file 133 is pushed from the management service 115 to the management component 127. In other examples, the management component 127 accesses a command queue associated with the management service 115 to obtain the baseline configuration file 133.

In step 506, the management component 127 identifies the baseline 145 from the baseline configuration file 133. For example, the management component 127 can parse the baseline configuration file 133 to identify the list of policies to be applied to the client device 106 as specified by the administrator.

In step 509, the management component 127 applies the baseline 145 to the client device 106. The baseline 145 includes machine policies and/or user policies as specified by the administrator. In some examples, the management component 127 can modify a value in a registry 161 of the operating system 130 of the client device 106 to account for a policy. In other examples, a policy included in the baseline 145 is not a registry-based policy, and the management component 127 can apply the policy as required by the operating system 130. For example, the policy can include a security policy that is applied through a command-line of the operating system 130. In this example, the management component 127 can interact with the command-line to apply the particular policy. For example, the management component 127 can execute a script that can apply the policy to the command-line. The management component 127 can apply both machine policies and user policies.

In step 512, the management component 127 can detect whether a policy has been modified from the policy defined in the baseline 145. For example, the management component 127 can determine that a registry entry for a particular policy differs from the policy and/or setting defined in the baseline 145. This could be a result of a user of the client device 106 modifying a policy setting in the registry 161. If the management component 127 detects a policy modification, the management component 127 returns to step 509 and reapplies the baseline 145 such that the system is configured as specified by the administrator. If the management component 127 fails to detect a policy modification, the process can proceed to completion.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 115, baseline service 118, client applications 121, management components 127, and other various services and functions described can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system for machine policy enforcement, the system comprising:
    a client device enrolled in a management service; and
    at least one application executable in the client device, wherein the at least one application, when executed, causes the client device to:
        obtain a baseline configuration file from a computing device associated with the management service, the baseline configuration file comprising a list of policies associated with an operating system of the client device, and the baseline configuration file being obtained from a command queue of the computing device; and
        apply the list of policies for the client device by modifying a registry of the operating system in accordance with the list of policies.

2. The system of claim 1, wherein a particular policy in the list of policies is a non-registry policy, and applying the particular policy further comprises generating a command-line input to apply the particular policy using a command line interface of the operating system.

3. The system of claim 1, wherein the baseline configuration file comprises an extensible markup language (XML) document.

4. The system of claim 1, wherein the at least one application further causes the client device to at least detect a change to the registry that differs from a policy included in the list of policies.

5. The system of claim 4, wherein the at least one application further causes the client device to at least reapply the baseline configuration file in an instance in which the change is detected.

6. The system of claim 1, wherein the list of policies include Group Policy settings.

7. The system of claim 1, wherein the baseline configuration file specifies a schedule associated with a deployment of the baseline configuration file.

8. A computer-implemented method for machine policy enforcement, comprising:
    obtaining, by a client device, a baseline configuration file from a computing device associated with a management service, the baseline configuration file comprising a list of policies associated with an operating system of the client device, and the baseline configuration file being obtained from a command queue of the computing device; and applying, by the client device, the list of policies for the client device by modifying a registry of the operating system in accordance with the list of policies.

9. The computer-implemented method of claim 8, wherein a particular policy in the list of policies is a non-registry policy, and applying particular policy further comprises generating a command-line input to apply the particular policy using a command line of the operating system.

10. The computer-implemented method of claim 8, wherein the baseline configuration file comprises an extensible markup language (XML).

11. The computer-implemented method of claim 8, further comprising detecting a change to the registry that differs from a policy in the list of policies.

12. The computer-implemented method of claim 11, further comprising reapplying the baseline configuration file in an instance in which the change is detected.

13. The computer-implemented method of claim 8, wherein the list of policies comprises a plurality of Group Policy settings.

14. The computer-implemented method of claim 8, wherein the baseline configuration file specifies a schedule associated with a deployment of the baseline configuration file.

15. A non-transitory computer-readable medium embodying a program executable in a client device, wherein when executed, the program causes the client device to at least:

obtain a baseline configuration file from a computing device associated with a management service, the baseline configuration file comprising a list of policies associated with an operating system of the client device, and the baseline configuration file being obtained from a command queue of the computing device; and apply the list of policies for the client device by modifying a registry of the operating system in accordance with the list of policies.

16. The non-transitory computer-readable medium of claim 15, wherein a particular policy in the list of policies is a non-registry policy, and applying particular policy further comprises generating a command-line input to apply the particular policy using a command line of the operating system.

17. The non-transitory computer-readable medium of claim 15, wherein the baseline configuration file comprises an extensible markup language (XML).

18. The non-transitory computer-readable medium of claim 15, wherein, when executed, the program further causes the client device to at least:

detect a change to the registry that differs from a policy in the list of policies; and reapply the baseline configuration file in an instance in which the change is detected.

19. The non-transitory computer-readable medium of claim 15, wherein the list of policies comprises a plurality of Group Policy settings.

20. The non-transitory computer-readable medium of claim 15, wherein the baseline configuration file specifies a schedule associated with a deployment of the baseline configuration file.

* * * * *